March 12, 1968  C. E. HAGSTROM  3,373,067
METHOD OF MAKING CLEATED CONVEYOR BELTS
Filed Feb. 19, 1965

— PRIOR ART —

CARLYLE E. HAGSTROM
INVENTOR
BY
BUCKHORN, BLORE, KLARQUIST & SPARKMAN
ATTORNEYS

United States Patent Office 3,373,067
Patented Mar. 12, 1968

3,373,067
METHOD OF MAKING CLEATED CONVEYOR BELTS
Carlyle E. Hagstrom, Portland, Oreg., assignor to Goodyear Rubber & Supply Company, Inc., Portland, Oreg., a corporation of Oregon
Filed Feb. 19, 1965, Ser. No. 433,917
4 Claims. (Cl. 156—153)

ABSTRACT OF THE DISCLOSURE

This application discloses a method of making cleated conveyor belts. In the illustrated method the outer cured rubber surface of a length of finished belt material is roughened at intervals therealong corresponding to the desired spacing of the cleats. A generally I-shaped strip of uncured rubber cleat material is then inserted into a preheated aluminum mold having a cavity conforming in size and shape to the desired finished size and shape of the cleat, the amount of strip material being such that it substantially fills the cavity and has an edge portion protruding beyond the outer end thereof. A vulcanizing cement is applied to the roughened surface that will receive the cleat, and the loaded mold is placed on the belt overlying the roughened surface, after which a vulcanizer press presses the mold against the belt and applies heat to the mold. The resulting heat and pressure transmitted to the strip material causes such material to flow into exact conformity with the mold cavity and into interengagement with the roughened surface of the belt to form a permanent bond with the latter. Simultaneously, the strip material is cured. The open end portion of the mold cavity is so shaped that the base of the resulting finished cleat is formed with curved surfaces which merge smoothly and gradually with the surface of the belt. Thus, upon removal of the mold from the belt, no finish grinding operations are required, and the belt is provided with a permanent cleat which appears as an integral part of the belt material. Several cleats can be joined to the belt simultaneously using the foregoing method.

---

The present invention relates to a method of making cleated conveyor belts, and more particularly to such belts having a surface layer of rubber and rubber cleats. Cleated belts are commonly used, for example, in the food-packaging and canning industries to convey berries, peas and other fruits and vegetables.

The manufacture of such belts is largely a custom, hand labor operation because of the differing requirements of various users as to belt size and cleat length, height, shape, color and spacing. Such belts heretofore have been made to order from finished lengths of conveyor belt material and separate lengths of preformed T-shaped cured rubber cleat material which are cut to length and bonded together to required specifications.

Prior methods of bonding the cleat material to the belt have involved expensive, time-consuming and exacting operations requiring highly skilled labor to perform. Even when properly executed, such methods have not given uniformly good results, and there has been considerable difficulty in obtaining a satisfactory and permanent bond between the cleats and the belt material. Separation of cleats from the belts during use has created maintenance problems, and, in the food industry, a bacteria problem because of the collection of food particles at such points.

The inverted T-shaped cleats required in prior methods have also necessitated careful preparation and sizing prior to bonding and a special finish-grinding operation after bonding, in the absence of which an inferior bond and bacteria problems result. Such cleats have had to be made to close manufacturing tolerances to be usable in the known methods, and such tolerances are difficult to maintain, often resulting in rejection and consequent wastage of material.

Accordingly, a primary object of the present invention is to provide a new and improved method of making custom cleated conveyor belts which eliminates the above objections.

More specifically, an object of the invention is to provide a new and improved method of making cleated belts which provides a consistently better and more permanent bond between the cleats and the belt material than with prior methods.

Another object is to provide a method as aforesaid which provides an attractive appearing cleated belt having an almost imperceptible joint between the cleat and the belt material.

Still another object is to provide a method as aforesaid which requires less time, skill and expense to perform than previous methods.

A further object is to provide a method as aforesaid which eliminates many of the preparatory and finishing operations previously required to bond a cleat to a belt, and which specifically eliminates all finish-grinding operations heretofore required after the bond has been made.

Another object is to provide a method of making cleated belts which utilizes uncured rubber as the raw cleat material, and which can utilize raw material of various sizes and lengths, thereby eliminating wastage.

Another object is to provide a method as aforesaid which forms and cures the cleats as they are bonded to the belt, thereby enabling use of a raw material of a simplified shape which need not be manufactured to as close tolerances as the cleat material required for previous methods.

The above and other objects and advantages of the present invention will become more apparent in the following detailed description which proceeds with reference to the accompanying drawings wherein.

Figure 16:
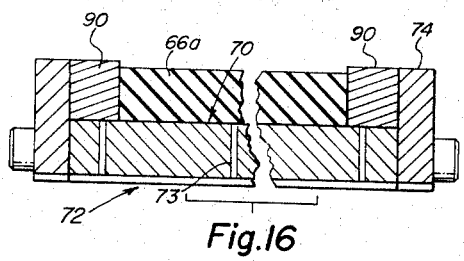
Figure 17:
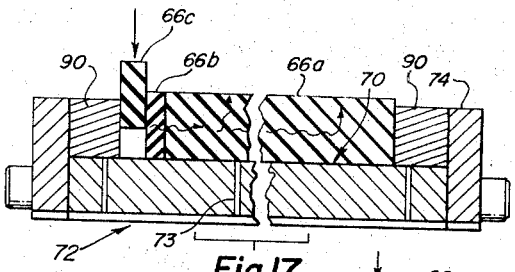
Figure 13:
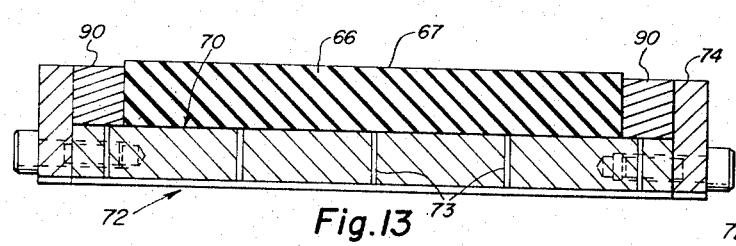
FIG. 13 is a schematic longitudinal sectional view through the mold taken along the line 13—13 of FIG. 12.
Figure 18:
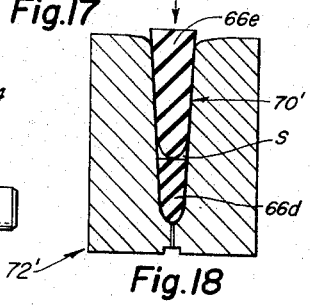

FIGS. 16 and 17 are fragmentary schematic sectional views through the mold of FIG. 13 illustrating a manner of adjusting the amount of raw cleat material within the mold cavity when the original strip of such material is slightly undersized; and FIG. 18 is a schematic sectional view of a large-sized mold having a cavity for forming a larger cleat than those previously illustrated, and showing a manner of filling the cavity of such mold with strips of undersized raw cleat material.

Summary of prior art methods

With reference to the drawings, FIGS. 1 through 4 illustrate one prior art method of making a cleated belt in which inverted T-shaped cleats 10 of cured rubber having flanged base portions 12 are bonded to a length of conventional conveyor belt 14 having a cured rubber body portion 16 and surface layer 18 interlaced with one or more laminations of fabric 20 for strength. According to this method a plurality of shallow transverse recesses 22, each having a width equal to the width of the flange portions 12 of the cleat 10, are ground into the surface layer 18 of the belt to a depth approximating one-half the thickness of the flange portions 12. The recesses are formed at intervals along the belt corresponding to the desired center distances between cleats.

Each cleat 10 is inserted into a correspondingly shaped cavity 24 of a metal mold 26, with the widened portion 27 of the cavity that receives the base 12 of the cleat having a lesser depth than thickness of the cleat flange 12 so that a sufficient amount of the flange protrudes from the mold to fill the belt recess 22. If the cleat 10 is undersized so that it does not extend to the bottom of the cavity 24, a rigid filler strip 28 must be placed in the bottom of the mold cavity to provide a backing for the cleat. Otherwise a poor bond will result in that portion of the base flange 12 aligned beneath the main stem of the cleat. If the raw cleat material is oversized, it must either be ground to size or discarded. If the amount of flange material protruding from the mold cavity is not great enough to extend to the bottom of the recess 22, the cleat must also be discarded, for there would be no bond formed between the base surface of the flange and the bottom of the recess.

Figure 3:
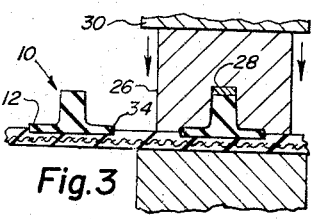
Figure 4:
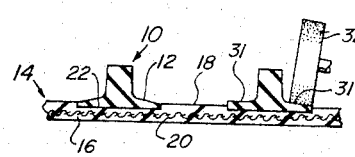

With the cleat in the mold, the exposed base surface of the flange 12 is ground or buffed to remove any grease, wax and soapstone. Thereafter both the exposed surface of the cleat and the recess 22 in the belt are primed with two coats of rubber cement. Finally the mold is positioned on the belt so that the protruding base of the flange 12 is inserted into the recess 22 as shown in FIG. 3, and heat and pressure are applied to the mold and thus to the cleat by a press 30 to bond the flange to the belt. After the mold is removed from the belt, the upper surfaces 31 of the flange 12 of each cleat are ground by a grinding wheel 32 to a tapered feather edge merging with the belt surface to remove the abrupt shoulders 34 (FIG. 3) that would tend to catch material conveyed by the belt. This operation is of especial importance in the food industry to prevent collection of food particles and thus the buildup of bacteria at such points.

With the foregoing method, it will be appreciated that the quality and permanency of the bond between the cleat and the belt depends on exact sizing of the cleats and belt recesses. Such accurate sizing requires skilled execution of the method and much time, and even with skilled performance, it has been found that the flanges or parts thereof will occasionally peel from the belt during normal usage, providing areas where food particles collect and bacteria thrive. When a cleat fails, the conveyor must be shut down until the cleat can be either rebonded to the belt or a replacement belt can be acquired.

Figure 1:
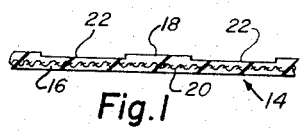
FIGS. 1 through 4 are schematic sectional views illustrating a prior art method of joining a rubber cleat to a section of rubber-surfaced conveyor belt.
Figure 2:
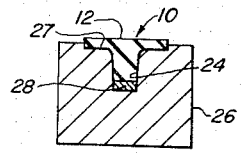
Figure 5:
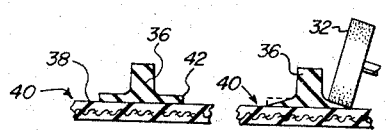
FIGS. 5 and 6 are schematic sectional views which illustrate a second prior art method of joining a rubber cleat to a section of belt material.
Figure 6:
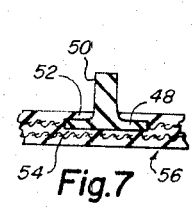

FIGS. 5 and 6 illustrate another prior art method in which an inverted T-shaped cleat 36 of cured rubber like that of FIG. 3 is applied directly to a roughened surface portion 38 of a belt 40 like that of FIG. 1 without first providing a recess in the belt surface. The cleat 38 is prepared as in the first-described method and placed in a mold like that of FIG. 2. The cleat and belt surfaces to be joined are both roughened or at least thoroughly cleaned and then coated with cement. Thereafter the flange of the cleat is pressed onto the belt surface, either with or without the application of heat. Then the high corners 42 of the flange are ground off by a grinder as before. This method, although eliminating the recessing operation of the method of FIGS. 1 through 4, usually provides an inferior bond.

Figure 7:
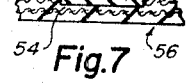
FIG. 7 is a schematic sectional view illustrating a portion of a cleated belt made in accordance with a third prior art method.

FIG. 7 illustrates a cleated belt formed in accordance with still another prior art method which involves insertion of the flange portion 48 of a cured rubber, T-shaped cleat 50 between the surface lamination 52 and an interior lamination 54 of a conveyor belt 56 by first slitting and peeling back the surface layer 52 and then cutting the same to size. It will be appreciated that this method is even more time consuming and difficult to perform than the two prior art methods previously described.

Present method

Figure 8:
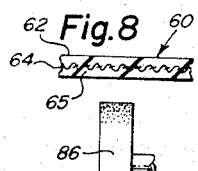
FIG. 8 is a schematic sectional view of a short length of conveyor belt material used in performing the method of the present invention.
Figure 9:
FIG. 9 is a cross-sectional view through a strip of raw cleat material used in performing the method of the present invention.
Figure 10:
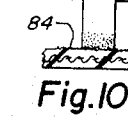
FIG. 10 is a schematic sectional view showing a surface area of the belt of FIG. 8 being abraded in accordance with the method of the present invention.
Figure 12:
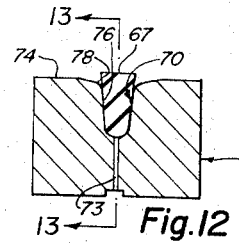
FIG. 12 is a schematic sectional view through a mold showing the strip material of FIG. 9 inserted within the mold cavity in accordance with a step of the present invention.

Referring first to FIGS. 8 and 9, the present method uses as raw material a finished conveyor belt 60 of the same construction as the conveyor belts used in the previously described methods and including a cured rubber surface layer 62, and one or more interior fabric laminations 64 embedded in a rubber base 65. The raw cleat material comprises strips 66 of uncured rubber having a generally I-shaped cross section which is extruded to approximate the desired finished size and shape of the cleat. The illustrated cleat material 66 tapers slightly from its wide flat base 67 to its slightly narrower, rounded top 69. As shown in FIGS. 12 and 13, the cleat is made to fit within the cavity 70 of a mold 72 made of high heat-conductive metal such as aluminum. The mold is provided with flash ports 73 communicating with the bottom of the cavity 70 at spaced intervals along its length. The outer end surface 74 of the mold intersects the sidewalls 76 of the mold cavity at rounded corners 78 which diverge from the strip material 66 to provide a smooth transition between such walls and the end surface 74. The cavity 70 conforms exactly to the desired finished size and shape of the cleats.

Figure 14:
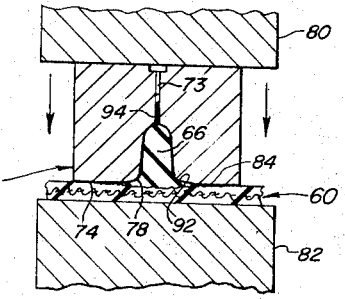
FIG. 14 is a schematic fragmentary sectional view showing the mold of FIG. 12 on the belt of FIG. 8 and within a vulcanizing press in accordance with a further step of the invention.

As shown in FIG. 14, the mold 72, together with other similar molds, are adapted to be placed within a conventional vulcanizing press 80 having suitable means (not shown) for heating the mold 70 to the desired temperature and other means (not shown) for pressing several molds 70 simultaneously against the belt 60 supported on a work table 82.

Performance of present method

Figure 11:
FIG. 11 is a view similar to that of FIG. 10 showing the abraded surface area coated with a bonding agent.

In performing the present method, the surface 62 of the belt is prepared by roughing or abrading narrow transverse surface areas 84 with a suitable grinding wheel 86 at spaced intervals along the belt at the desired locations of the cleats, to remove dirt, surface wax and other foreign matter and thus promote a good bond. The width of the areas 84 are considerably greater than the base width 67 of the raw cleat material for a purpose that will be apparent shortly. Thereafter a neoprene cement 88 (FIG. 11) is applied to the roughened areas 84 and allowed to dry.

The molds are prepared by adjusting the length of the cavity 70 to correspond to the length of finished cleat desired by inserting filler block 90 as required at each end of the cavity, as shown in FIG. 13. The molds are then preheated, preferably to a temperature of approximately 285° to 325° Fahrenheit, to bring the cavities to exact size. The surfaces of the cavity are sprayed with a mold release compound to promote easy removal of the cleat material from the molds.

No special preparation of the raw cleat strips is required. Such strips can be purchased in lengths of eight feet or more. A strip of the length required to fill the mold cavity is cut from the raw stock and placed in the mold. If the strip cut is too short to fill the mold cavity, additional sections can be added at one end of the cavity as shown in FIG. 17, until the cavity is filled. As shown in FIGS. 12 and 13, the width of the strip 66 should be greater than the depth of the cavity so that the base 67 of the strip projects outwardly of the cavity beyond the end surface 74 of the mold to provide sufficient material to flow into conformity with the outer portion of the cavity. If the strip should happen to be undersize, as is the strip 66a of FIG. 16, such strip need not be discarded. Instead, additional sections 66b and 66c of strip material can be added at either end of the cavity until the uncured rubber material within the cavity swells to the desired level as shown in FIG. 17.

With the strip material filling all but the rounded outer corners of the mold cavity, the mold is turned upside down and positioned on the surface of the belt as shown in FIG. 14 so that the uncured cleat material is positioned centrally on an abraded surface area 84. Depending on the capacity of the press 80, several molds are placed side by side on adjacent abraded areas of the belt. Then the press 80 is brought into operative engagement with the molds to heat and simultaneously press them against the belt, thereby transmitting heat and pressure to the strip material 66 within the molds and causing it to flow into exact conformity with the mold cavities. In this connection the strip material will flow and spread into the porous surface areas 84 of the belt and into conformity with the curved corners 78 of the mold cavity. At the same time, the pressure of the mold presses the strip material into firm engagement with the belt, thus assuring a good bond between the belt and the strip material and a smooth and gradual merging of the reformed and widened base portion 92 of the cleat with the belt surface 62 (see FIG. 15). The heat and pressure applied is furthermore sufficient to cure the initially uncured strip material as it is reshaped and bonded to the belt.

Figure 15:
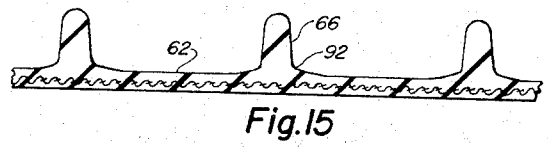
FIG. 15 is a schematic longitudinal sectional view through a length of cleated conveyor belt made in accordance with the present invention.

After the cleat material has been subjected to heat and pressure sufficient to fulfill the above objectives of reforming, bonding and curing, the molds are removed from the belt, leaving a finish-formed cleat, as shown in FIG. 15, permanently attached to the belt. Any flashing 94 in the flash ports 73 resulting from excess strip material in the mold will usually be removed from the cleat with the mold. No finish-grinding is required, as the radius 78 on the outer portion of the mold cavity provides a smooth juncture of the base of the cleat with the belt surface as previously mentioned. The finished cleats will have the appearance of being an integral part of the rubber coating 62 of the belt itself, as any juncture between the cleats and such surface will be almost imperceptible.

A further advantage of the present method is that the finished cleats are all of a uniform size inasmuch as they are cured in the same or identical molds, whereas in accordance with prior art methods the finished sizes of cleat would often vary considerably because such cleats were not usually cured in molds under pressure. Additionally, with the present method there has been no experience of premature separation of cleats from the belt either at the midportion of the cleat or at its edges so that no maintenance or bacteria problem is presented in these respects.

A most important advantage of the present method is that there is no waste of strip material, as even odd lengths and sizes can be used to fill a mold cavity and then combined into an integral cleat during the molding and bonding process. The use of undersized strips has been previously described with respect to FIGS. 16 and 17. Conversely, if the strip material is oversized so that too much material projects from the mold cavity, the excess material will merely be flashed upwardly into the flash ports 73 to be removed with the mold or, as shown in FIG. 14, laterally outwardly into the laterally outermost reaches of the roughened surface portions 84 of the belt to be bonded to the belt surface by the vulcanizing cement on such surface.

The use of uncured raw material in forming cleats makes possible further efficiencies as illustrated in FIG. 18. Normally in the industry cleats are ordered in either one-, two- or three-inch heights. This being the case, molds must be made in corresponding sizes, and a mold 72′ for forming a cleat having a height of three inches is illustrated in FIG. 18. However, it is not necessary to order strip material having approximately a three-inch width for forming cleats of this height, as one- and two-inch strip stock can be combined for this purpose. In filling the three-inch mold cavity 70′, a piece of one-inch strip material 66d is first placed in the bottom portion of the cavity and a piece of two-inch stock 66e, normally used in making two-inch cleats, is placed on top of the one-inch strip, thus approximately filling the mold cavity. Since both the one- and two-inch stock are designed to exceed in width the depth of the mold cavities for which they are intended, their combined heights will exceed the depth of the three-inch mold cavity to provide the necessary excess to fill out the spaces S in the interior of the cavity and the radius at the outer corners of the cavity upon application of heat and pressure.

*Example.—Manufacturing a one-inch cleated belt*

In an actual performance of the foregoing method for making a belt having one-inch cleats, an aluminum mold was used having a cavity one inch in depth and $5/16$ inch wide at its inner end tapering to $7/16$ inch at its outer end. Three-sixteenth-inch radii were provided at the outer corners of the cavity, and a $5/32$ inch radius was provided at the bottom of the cavity.

The roughened surface areas of the belt measured two and one-half inches wide and extended one inch beyond the ends of the cleat to be used. The roughened areas were coated with two coats of neoprene vulcanizing cement, with masking tape being used to keep the cement off the smooth surface areas.

The molds were preheated to approximately 285° to 325° Fahrenheit, the approximate temperature at which the cleat is applied to the belt. The molds were pressed against the belt at a pressure of approximately 70 to 100 p.s.i. after the base of the uncured cleat material had been swabbed with a cleaning solvent to remove any grease or dirt. The vulcanizing press used to transmit heat and pressure to the molds was sufficiently large to receive six molds placed side by side so as to provide a belt with cleats spaced on four-inch centers. It was found that the molding-curing-bonding operation, using the foregoing temperature and pressure ranges, should preferably be continued for about twenty to thirty minutes to assure a permanent bond. The cleats when cured according to the foregoing specifications were found to have a durometer hardness index of about 50 to 55.

In summary, the present method provides a better, more permanent bond between belt and cleats with less preparation of belt and cleats than prior art methods, with additional advantages in sanitation, cost, time and appearance.

Having illustrated and described a preferred embodiment of the present invention, it should be apparent to those skilled in the art that the invention permits of modification in arrangement, detail and sequence of the various steps described herein. I claim as my invention all

I claim:

1. A method of bonding an upstanding rubber cleat or the like to a length of belt having a surface of cured rubber, said method comprising:
abrading the cured rubber surface of said belt throughout a predetermined width in a surface area to which the cleat is to be applied,
applying a vulcanizing cement to the abraded surface area of said belt,
then pressing the base of a length of uncured rubber cleat stock of generally I-shaped cross section having a base width substantially less than the width of the abraded surface area of the belt against said abraded surface area and between the lateral limits of the abraded area,
and while pressing said uncured cleat stock against said belt as aforesaid heating the uncured stock and thereby flowing the base of said cleat stock laterally onto the abraded surface area of said belt throughout substantially the entire width of said abraded area while restraining the remaining portions of said cleat stock against flowing deformation,
and while pressing and heating said cleat stock as aforesaid controlling the flow of the base portion thereof so that said portion merges smoothly and gradually with the belt surface throughout the width of the abraded surface area thereof,
and continuing the application of heat and pressure to said cleat stock to cure the same and provide a permanent bond with said belt surface.

2. A method according to claim 1 wherein the flow of the base of said uncured cleat stock is controlled and the remainder of the uncured stock is restrained against lateral deformation by providing a mold having a mold cavity and filling said cavity to overflowing with said uncured stock so that a base portion of the stock protrudes outwardly beyond the limits of the cavity, and providing said cavity with an outer end portion which diverges from engagement with the base portion of the uncured stock and merges smoothly and gradually with a belt confronting surface of the mold.

3. A method of bonding an upstanding rubber cleat or the like to a length of belt having a flat cured rubber surface comprising:
filling a mold cavity having a generally T-shaped cross section corresponding to the desired cross-sectional shape of the finished cleat to overflowing with uncured generally I-shaped cleat stock so that a base portion of the uncured stock protrudes outwardly beyond the outer limits of the open end of the mold cavity,
providing the mold cavity with an enlarged outer end forming the cross of the T which merges smoothly and gradually with a belt confronting end surface of the mold and diverges from engagement with the base of the uncured I-shaped cleat stock within the cavity,
abrading the cured rubber belt surface in the area to which the cleat is to be applied and throughout a width substantially greater than the base width of the uncured rubber stock and approximating the width of the outer end of the mold cavity,
applying a vulcanizing cement to the abraded surface area of the belt,
then pressing the protruding base of the uncured cleat stock against the abraded surface area of said belt between the limits of such abraded area by applying pressure to said mold and simultaneously heating said uncured stock to a temperature sufficient to cause the base thereof to flow laterally onto said abraded belt area and throughout substantially the entire width of said abraded area by applying heat to said mold,
while pressing and heating said uncured cleat stock as aforesaid, controlling the flow of the base portion of said stock so that said base portion merges smoothly and gradually with the belt surface over the width of said abraded surface area by maintaining the flowing base portion of said stock within the confines of said mold cavity and flowing the base portion to fill the enlarged outer end portion of said cavity,
and continuing the application of heat and pressure to said stock until the same is cured and bonded to said belt surface.

4. A method according to claim 3 wherein said uncured cleat stock is heated to a temperature of at least about 285° F., the heat and pressure is applied to said stock for at least about 20 minutes, and the abraded surface area of the belt is at least about three times the initial base width of the uncured cleat stock.

References Cited

UNITED STATES PATENTS

| 2,343,724 | 3/1944 | Wheatley | 156—96 |
| 2,392,590 | 1/1946 | Holswit et al. | 156—96 |
| 2,697,472 | 12/1954 | Hawkinson | 156—153 XR |
| 3,143,450 | 8/1964 | Barber et al. | 156—126 |

EARL M. BERGERT, Primary Examiner.

M. L. KATZ, Assistant Examiner.